United States Patent
Meacham et al.

[15] 3,685,499
[45] Aug. 22, 1972

[54] EMISSION CONTROL DEVICE

[72] Inventors: George B. K. Meacham, 444 W. Lincoln, Birmingham, Mich. 48009; James L. Oliver, 3354 Prairie St., Royal Oak, Mich. 48072

[22] Filed: Sept. 16, 1970

[21] Appl. No.: 72,860

Related U.S. Application Data

[62] Division of Ser. No. 785,324, Dec. 19, 1968, Pat. No. 3,626,720.

[52] U.S. Cl. .................................. 123/90.15, 64/25
[51] Int. Cl. ........................... F01l 1/34, F16d 5/00
[58] Field of Search ...... 123/90.15, 90.18; 64/24, 25; 74/89

[56] References Cited

UNITED STATES PATENTS

| | | | |
|---|---|---|---|
| 3,258,937 | 7/1966 | Kranc et al. | 64/25 |
| 2,978,915 | 4/1961 | Metcalf | 74/89 |
| 2,305,787 | 12/1942 | Kales | 123/90.15 |
| 2,804,061 | 8/1957 | Gamble | 123/90.18 |
| 2,121,560 | 6/1938 | Duncan | 123/90.15 |
| 3,481,314 | 12/1969 | LeCrenn | 123/90.18 |
| 2,861,557 | 11/1958 | Stolte | 123/90.15 |
| 3,401,572 | 9/1968 | Bailey | 123/90.15 X |

*Primary Examiner*—Al Lawrence Smith
*Attorney*—Woodhams, Blanchard, and Flynn

[57] ABSTRACT

A mechanism for varying the phase relationship of a camshaft with respect to a crankshaft. A driven member is secured in fixed relationship to the camshaft and is connected through a helical ball spline to a piston member which is nonrotatably related to the crankshaft. The piston member and the driven member define a fluid chamber therebetween. A shiftable valve member permits flow of fluid to said chamber causing the piston to move axially relative to the driven member, whereby the helical ball spline causes the driven member to rotate relative to the piston, which in turn causes rotation of the camshaft relative to the crankshaft. The valve member may be controlled either manually or automatically in response to an engine operating condition.

10 Claims, 7 Drawing Figures

PATENTED AUG 22 1972
3,685,499
SHEET 1 OF 2
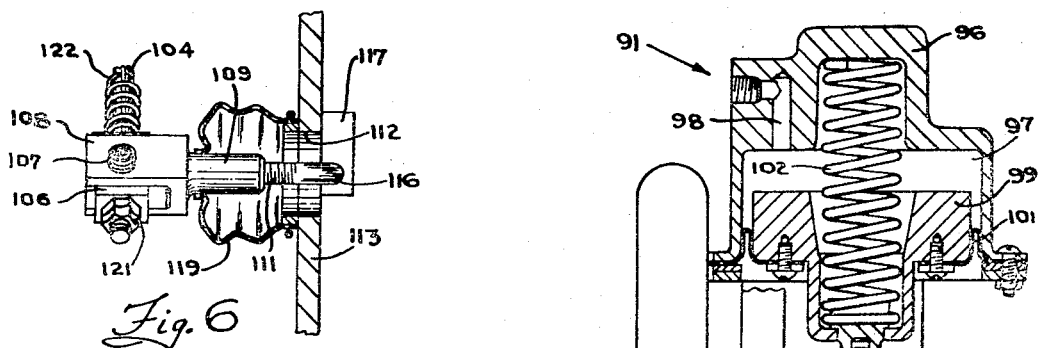
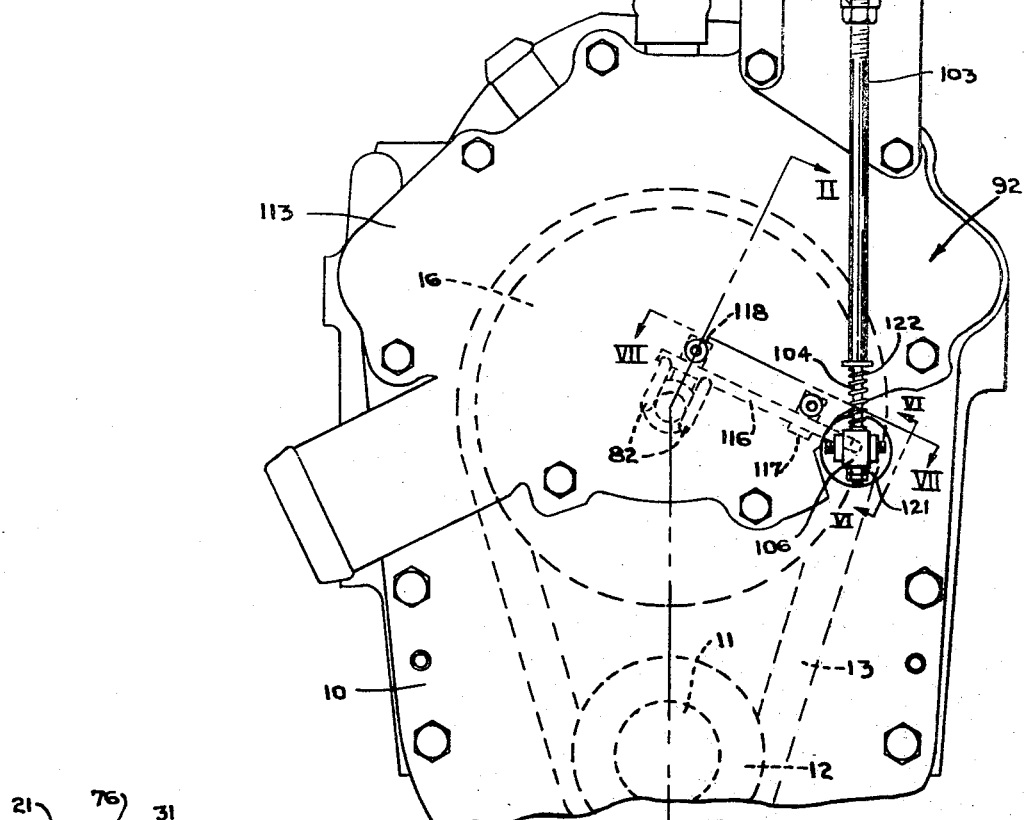
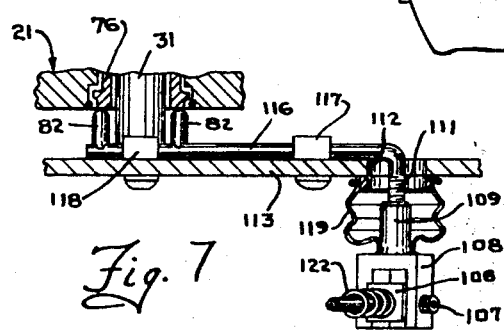
INVENTORS
GEORGE B.K. MEACHAM
JAMES LESTER OLIVER
BY
Woodhams, Blanchard & Flynn
ATTORNEYS

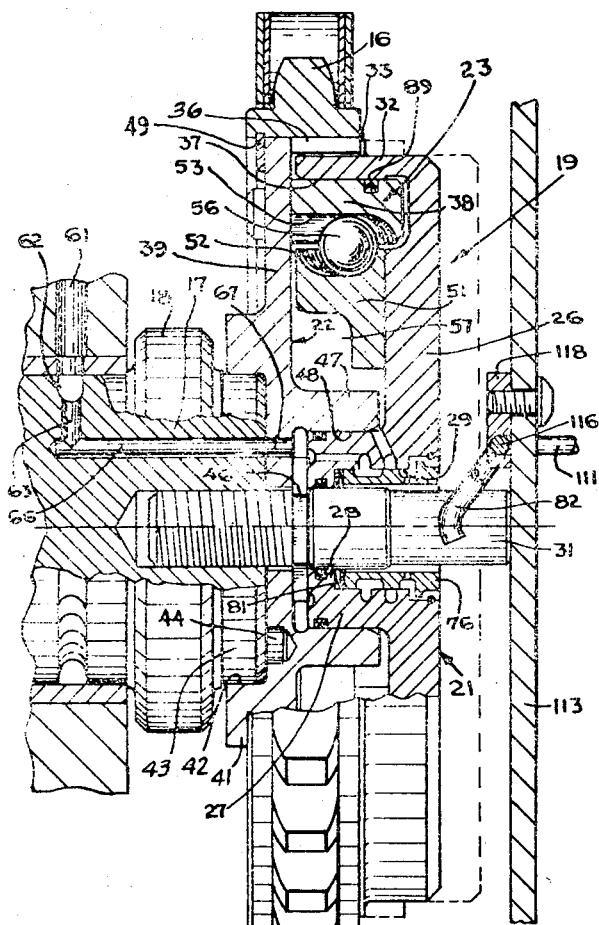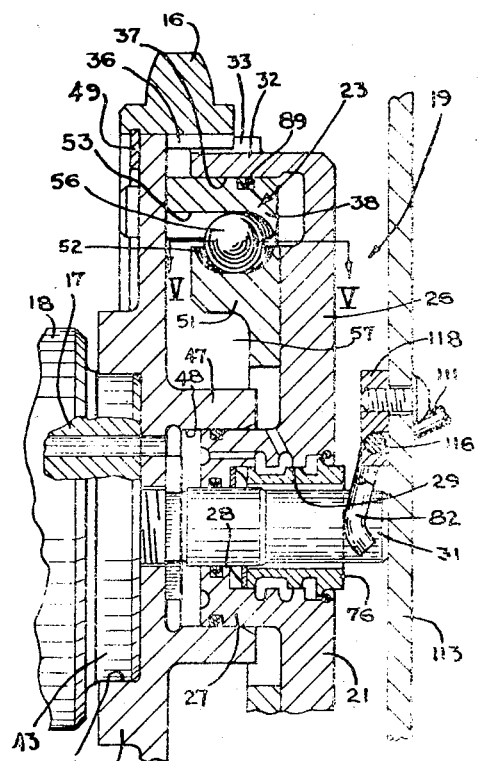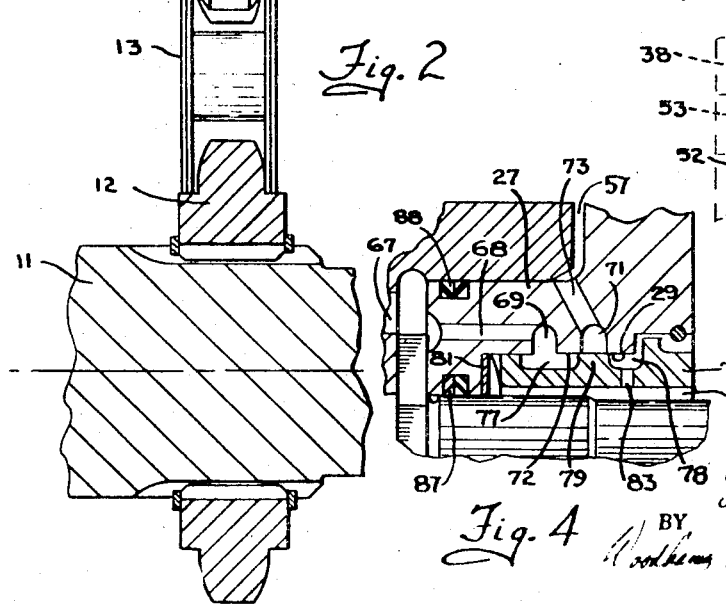

EMISSION CONTROL DEVICE

This application is a division of our copending application Ser. No. 785 324, filed Dec. 19, 1968 now U.S. Pat. No. 3,626,720.

FIELD OF THE INVENTION

This invention relates to a mechanism for causing relative rotation between first and second members while torque is being continuously transmitted between said two members and, in particular, to a hydraulic mechanism for advancing or retarding the phase relationship of an engine camshaft relative to a driving crankshaft.

BACKGROUND OF THE INVENTION

Many different load and environmental situations arise which make desirable the ability to advance or retard the phase relationship of the camshaft of an engine, particularly an internal combustion engine, relative to the crankshaft. Specifically, there often exists a need to be able to adjust the opening and closing movements of either or both the intake and exhaust valves.

In particular, there is presently a great deal of concern about the problem of air pollution, much of which is specifically attributed to the noxious exhaust gas emissions of internal combustion engines utilized in motor vehicles. Great amounts of effort have been and are being expended in an attempt to control the exhaust gas emission of motor vehicles in the hopes of reducing air pollution. As explained in detail in copending application Ser. No. 746 644, filed July 22, 1968, and entitled "Emission Control System", it has been found that a substantial reduction in the noxious exhaust gas emissions can be achieved by providing for varying the timing of the opening and closing movements of the intake and/or exhaust valves in response to engine operating characteristics, such as load.

Various types of mechanism have previously been proposed for causing variation in the phase relationship between the camshaft and the crankshaft. However, most of these devices were designed to achieve an entirely different effect, such as to provide increased engine braking. Consequently, while these prior devices are able to vary the phase relationship between the camshaft and the crankshaft, the devices do not permit variations of the phase relationship with sufficient accuracy to insure precise control over the adjustment of the camshaft to permit maximum reduction in the emission of noxious exhaust gases.

Further, most of the prior known advance and retard mechanisms were of a complicated structure, were bulky and of an undesirable size, and were inefficient in operation, particularly if applied to emission control purposes.

Accordingly, it is an object of this invention:

1. To provide an improved advance and retard mechanism for causing variation in the phase relationship between the crankshaft and the camshaft of an engine.
2. To provide a mechanism, as aforesaid, for permitting the phase relationship of an engine to be varied during operation thereof.
3. To provide a mechanism, as aforesaid, provided with a helical ball spline for permitting the phase relationship to be accurately varied.
4. To provide a mechanism, as aforesaid, which is compact and can be mounted directly adjacent one end of the camshaft.
5. To provide a mechanism, as aforesaid, which includes a driven member secured to the camshaft and a piston member nonrotatably secured to means fixedly related to the crankshaft, such as the timing gear, the driven and piston members being connected by a plurality of helical ball splines and having a fluid pressure chamber therebetween whereby pressurized fluid within said chamber causes relative axial and rotational movement between the piston member and the driving member for causing a change in the phase relationship between the camshaft and the crankshaft.
6. To provide a mechanism, as aforesaid, which includes a control valve for controlling flow of fluid to said chamber, the control valve being manually or automatically operated.
7. To provide a mechanism, as aforesaid, wherein the control valve is slideably mounted on said camshaft and the position thereof is automatically controlled by a servo control device which is responsive to an engine operating condition.
8. To provide a mechanism, as aforesaid, wherein the servo control device automatically positions the control valve in response to the load imposed on the engine.
9. To provide a mechanism, as aforesaid, wherein the servo control device automatically positions the control valve in response to the vacuum created in the spark vacuum port of the carburetor.
10. To provide a mechanism, as aforesaid, which permits the timing of the intake and/or exhaust valves to be readily adjusted for controlling the emission of noxious exhaust gases.
11. To provide a mechanism, as aforesaid, which is economical to manufacture, accurate in operation, relatively small in size, simple and efficient in operation, and substantially free of maintenance.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a fragmentary, elevational view, partially in section, of the front end of an engine.

FIG. 2 is a cross-sectional view of the advance and retard mechanism of the present invention taken substantially along the line II—II of FIG. 1.

FIG. 3 is a partial sectional view similar to FIG. 2 and illustrating the advance and retard mechanism in a different operational position.

FIG. 4 is an enlarged fragmentary, sectional view of the control valve illustrated in FIG. 2.

FIG. 5 is an enlarged fragmentary, sectional view taken along the line V—V of FIG. 3.

FIG. 6 is an enlarged fragmentary, sectional view taken along the line VI—VI of FIG. 1.

FIG. 7 is an enlarged fragmentary view taken along the line VII—VII of FIG. 1.

Certain terminology will be used in the following description for convenience and reference only and will not be limiting. The words "upwardly", "downwardly", "rightwardly" and "leftwardly" will designate directions in the drawings to which reference is made. The words "forward" and "rearward" will refer to the opposite ends of the engine and associated parts thereof, the word "forward" being the end normally adjacent the front end of a vehicle. The words "inwardly" and "outwardly" will refer to the directions toward and away from, respectively, the geometric center of the device and designated parts thereof. Said terminology will include the words above specifically mentioned, derivatives thereof and words of similar import.

SUMMARY OF THE INVENTION

In general, the objects and purposes of this invention are met by providing an advance and retard mechanism adapted to be mounted on the camshaft for permitting the angular position thereof to be varied relative to the crankshaft. The mechanism includes a driven member nonrotatably secured to the camshaft and a piston member nonrotatably secured to crankshaft related means, such as the camshaft timing gear. The driven member and piston member are interconnected by a plurality of helical ball splines for permitting relative rotational and axial movement therebetween and are further separated from one another to define a fluid chamber. A shiftable control valve is slideably mounted on an extension of the camshaft for permitting pressurized fluid to be supplied to the chamber, whereby the piston member is moved axially outwardly away from the driven member and, due to the helical splines, causes relative rotation between the piston member and the driven member. This thus causes the phase of the camshaft to be adjusted relative to the crankshaft. The control valve may be moved manually or automatically. A servo control device is preferably connected to the control valve for moving same in response to an engine operating condition, such as the vacuum created in the spark vacuum port of the carburetor.

DETAILED DESCRIPTION

FIGS. 1 and 2 illustrate a fragment of an engine block 10 having a conventional crankshaft 11 rotatably mounted therein. The crankshaft 11 has a driving pinion 12 secured thereto and drivingly connected by a timing chain 13 to a camshaft timing gear 16. The camshaft timing gear 16 is drivingly connected to a camshaft 17 by means of a cam advance and retard mechanism 19. Camshaft 17 further provided with a thrust plate 18 adjacent to the end of the engine block 10.

The cam advance mechanism 19 includes a piston 21 and a driven member 22, the latter being nonrotatably connected to the camshaft 17. A plurality of helical spline devices 23 are provided between the piston 21 and the driven member 22 as explained in greater detail hereinbelow.

The piston 21 includes an annular member 26 having a hollow inner hub portion 27 having stopped bores 28 and 29 therein. Bore 28 surrounds and rotatably receives therein a shaft extension 31, which shaft extension is fixedly connected to the adjacent end of the camshaft 17 by any suitable means, such as by being threadedly connected thereto. Piston 21 is further provided with an outer annular flange 32 having a plurality of substantially straight splines 33 formed on the outer periphery thereof. The splines 33 slideably engage similar straight splines 36 formed on the inner periphery of the camshaft timing gear 16.

The outer annular flange 32 defines a cylindrical internal bore 37 which slideably receives therein an annular outer race member 38, said race member comprising a portion of the driven member 22. Specifically, race member 38 is fixedly connected to a driven plate element 39 by any suitable means, such as by screws. The driven plate element 39 is of a generally annular configuration and is provided with a first hollow hub portion 41 formed on one side thereof, which hub portion 41 defines a cylindrical bore 42 into which extends a cylindrical pilot portion 43 formed on the end of camshaft 17. The driven plate element 39 and the camshaft 17 are nonrotatably interconnected by any convenient means, such as pins 44 which extend axially between the camshaft and the driven plate element. Driven plate element 39 is further provided with a second hollow hub portion 47, which hub portion 47 extends in the opposite direction from the first hub portion 41 and defines an annular bore 48 which slideably receives therein the hub portion 27 of the piston 21.

The annular plate element 39 is axially secured to camshaft 17 by means of the shaft extension 31, same having an enlarged flange portion 46 (FIG. 2) fixedly secured thereto and positioned within the bore 48. The flange portion 46 can be suitably formed with a hexagonal configuration to permit engagement therewith by a conventional tool so that the shaft extension 31 can be threaded into tight engagement with the camshaft 17, thereby tightly clamping the annular plate element 39 between the camshaft and the flange portion 46. The outer periphery of the annular plate member 39 is rotatably received within the camshaft timing gear 16 and is prevented from axially separating therefrom by means of a conventional annular retaining ring 49.

Outer race member 38 is positioned in surrounding relationship to an inner annular race member 51, which race member 51 is fixedly interconnected to the annular member 26 by any suitable means, such as by screws. The inner race member 51 is provided with a plurality of circumferentially spaced angularly extending slots 52 formed in the outer periphery thereof. The slots 52 extend at an angle relative to the axial direction of the camshaft, preferably extend in a helical arrangement. The slots 52 are disposed substantially adjacent similar straight slots 53 formed within the inner periphery of the outer race member 38, the slots 53 extending substantially axially relative to the camshaft 17. Each corresponding pair of slots 52 and 53 is provided with a spherical ball member 56 therein for causing relative rotation between the piston 21 and the driven member 22 in response to relative axial movement therebetween.

The driven member 22 has portions thereof which are axially separated from the piston 21 to define an annular chamber 57 therebetween, the opposite axial ends of which are bounded by suitable walls formed on the piston 21 and the driven member 22, respectively. Annular chamber 57 is suitably supplied, through a plurality of interconnected passageways, with pressurized engine oil for causing actuation of the advance and retard mechanism 19.

Specifically, engine block 10 is provided with a first passage 61 (FIG. 2) therein, which passage is supplied with pressurized engine oil. Passage 61 terminates in an annular groove 62 formed in the periphery of camshaft 17, which in turn communicates through a radial passage 63 with an axial passage 66 which extends to the end of the camshaft 17. Driven plate element 39 is further provided with an opening 67 therein in alignment with the passage 66 whereby the pressurized engine oil is supplied to the interior of the bore 48. From bore 48 the pressurized oil flows through a further axial passage 68 (FIG. 4) formed in the hub 27, which passage 68 communicates with a first annular groove 69 formed in the internal periphery of the bore 29. Bore 29 is provided with a second annular groove 71 therein axially spaced from the first annular groove 69 by means of an annular land 72. The second annular groove 71 is in communication with the annular chamber 57 by means of an intermediate passage 73.

To provide for control over the flow of fluid to and from the annular chamber 57, an annular shiftable spool valve 76 (FIG. 4) is positioned within the bore 29 in surrounding and sliding relationship with the shaft extension 31. Spool valve 76 has annular grooves 77 and 78 formed thereon, which grooves are separated by an annular land 79, same being in slideable sealing engagement with the bore 29. A spring 81 is positioned between the rearward end of the spool valve 76 and the bottom wall of the bore 29 for normally urging the spool valve in an outward or forward direction. Spring 81 is preferably an annular wavy spring washer. However, any suitable resilient or spring means could be utilized for this purpose. Spool valve 76 is maintained in engagement with spring 81 by means of a forked control arm 82 positioned adjacent to and in contact with the forward end of the spool valve 76.

Spool valve 76 is further provided with a radial discharge port 83 formed therein, which port communicates at the outer end thereof with the annular groove 78 and at its inner end with an annular clearance space 86 which exists between the spool valve and the shaft extension 31. The annular clearance space 86 in turn communicates with the engine sump.

To prevent leakage of engine oil, suitable seals 87 and 88 are provided between shaft extension 31 and hub portion 27, and between hub portions 27 and 47, respectively. A further resilient seal 89 is provided between the outer race 38 and the annular flange 32.

The shiftable spool valve 76 is thus movable to permit the passage 73 to communicate with one of the annular grooves 77 and 78 whereby pressurized engine oil can be either supplied to or discharged from the chamber 57. The spool valve 76 can be shifted either manually or automatically in response to an engine operating condition.

One such means for automatically controlling the shifting operation of the spool valve 76 involves the use of a spark vacuum control device 91 (FIG. 1), which control device 91 is interconnected to the control arm 82 by means of an intermediate linkage 92.

The control device 91 specifically includes a housing 96 secured to the engine block 10 by any suitable means. Housing 96 contains a chamber 97 therein in communication with a port 98 formed in the housing. Port 98 is suitably interconnected, as by conduit means, to the spark vacuum port of the carburetor of the engine whereby the vacuum created in the spark vacuum port also appears within the chamber 97. The lower end of the chamber 97 contains a piston 99 therein, which piston is freely positioned within the end of the chamber and is interconnected to the housing 96 by means of a flexible bellows or diaphragm 101 so as to close the chamber 97. A suitable compression spring 102 is positioned within the chamber 97 and has its opposite ends acting against the housing 96 and the piston 99 for urging the piston downwardly as illustrated in FIG. 1.

The lower end of the piston 99 is provided with a downwardly extending connecting rod 103 fixedly secured thereto. The connecting rod 103 has a reduced portion 104 adjacent its lower end, which reduced portion extends through a block 106 and is provided with threaded nuts 121 adjacent its lower end for preventing the reduced portion 104 from separating from the block 106. The block 106 is in turn interconnected by means of pivots 107 (FIG. 6) to a forked arm member 108, which arm member is provided with a threaded hub portion 109 threadedly received over a threaded crank member 111.

The crank 111 extends outwardly from the interior of the engine housing through an opening 112 (FIGS. 6 and 7) formed in the front wall 113 of the engine housing. A suitable bellows 119 (FIG. 6) is interconnected between the threaded hub 109 and the adjacent wall 113 to provide a suitable enclosure for the opening 112. Crank 111 is fixedly, here integrally, connected to a pivot shaft 116 which is rotatably supported within a pair of spaced bearing blocks 117 and 118 (FIG. 7) secured to the inner side of the front wall 113. The pivot shaft 116 has the forked control arm 82 nonrotatably and fixedly secured thereto, which control arm abuts against the forward end of the shiftable spool valve 76.

OPERATION

The operation of the device embodying the invention will be described in detail hereinafter for a better understanding thereof.

The cam advance mechanism 19 is illustrated in FIG. 2 in its retarded or normal position, that is, in a position where the camshaft timing gear 16 and driven plate element 39 are in a base phase relationship with respect to one another. This will occur when the engine is operating at a normal light operating load such that only a small vacuum will be present in the chamber 97. In this condition, the spool valve 76 is positioned (as illustrated in FIG. 2) such that the cylindrical land 79 formed thereon prevents flow of fluid to the annular groove 71, whereby no pressurized engine oil is permitted to flow into the annular chamber 57. Since the vacuum created within the chamber 97 of the control device 91 is of reduced magnitude, the spring 102 holds the rod 103 in a down position, the shaft 116 in a clockwise (FIG. 2) rotated position and the control arm 82 against the front end face of the spool valve 76, thereby holding same in the normal inward position illustrated in FIG. 2.

As the engine encounters an increase in the load applied thereto, an increased vacuum is created in the spark vacuum port. This increased vacuum also appears within the chamber 97 of the control device 91. The increased vacuum within chamber 97 permits the externally applied force, as caused by the atmosphere and the spring 81, to move the piston 99 inwardly (upwardly in FIG. 1) whereby the connecting rod 103 is similarly moved (upwardly in FIG. 1) which in turn causes rotational movement of the crank 111 (clockwise in FIG. 6), the amount of rotation of crank 111 being proportional to the change in vacuum within chamber 97. Rotation of the crank 111 causes similar rotation of the pivot shaft 116 and of the forked control arm 82 secured thereto, whereby the control arm is rotatably moved away from the spool valve 76 (counterclockwise in FIG. 2), the rotational movement of arm 82 also being proportional to the change in vacuum within chamber 97.

As control arm 82 moves away from the spool valve 76, annular spring 81 will cause the spool valve to move slightly forwardly (rightwardly in FIG. 2), thereby placing annular groove 77 in communication with both of the annular grooves 69 and 71. Consequently, pressurized engine oil will flow through the passages 61, 66 and 68 into the annular groove 77, whereupon the oil will then flow through the passage 73 into the annular chamber 57. The fluid acting against the inner walls of the chamber 57 forces the piston 21 to move axially outwardly (rightwardly in FIG. 2), said outward movement being permitted by the straight splines 33 and 36 provided between the flange 32 and the camshaft timing gear 16. However, as piston 21 moves axially outwardly, ball members 56 confined between the angularly inclined slots 52 and 53 exert a torsional reaction on the outer race 38 whereby the driven plate element 39 fixedly secured to the outer race 38 is caused to rotate relative to the piston 21. Rotation of the driven plate element 39 causes a similar rotation of the camshaft 17 whereby the camshaft 17 is thus angularly displaced relative to the gear 16 and thereby the crankshaft 11.

As the spool valve 76 and piston 21 advance axially outwardly (rightwardly in FIG. 2), spool valve 76 will catch up to the retracted control arm 82 and will contact same, thereby preventing any further outward movement of the valve. However, since piston 21 lags behind the spool valve 76, the piston will continue to move outwardly (rightwardly in FIG. 2) since pressurized fluid is still being supplied to the chamber 57. Such outward movement of the piston will continue until the cylindrical land 79 formed on the spool valve again closes off the annular groove 71, thereby preventing any further pressurized fluid from entering into the chamber 57. At this time, the pressure forces within the piston will have created a balanced force condition on the advancing mechanism 19 and same will thus be in a steady state condition. This condition will be maintained as long as the vacuum within chamber 97 remains substantially unchanged.

As the engine load decreases, the vacuum within the chamber 97 likewise decreases whereupon the piston 99 will be urged outwardly (downwardly in FIG. 1) causing rotational movement of the pivot shaft 116, which causes the control arm 82 to be rotatably urged in a direction toward the spool valve (clockwise in FIGS. 2 and 3). Control arm 82 will thus overcome the force exerted on the spool valve by the spring 81 whereby the spool valve will be urged inwardly toward the camshaft (leftwardly in FIG. 3). The control arm 82 and the spool valve 76 will be moved inwardly a distance proportional to the decrease in vacuum within chamber 97. Inward movement of the spool valve causes the annular groove 78 formed therein to come into communication with the annular groove 71 formed in the hub 27, whereupon at least some of the oil contained within the chamber 57 is exhausted through the discharge port 83 and the annular clearance space 86 into the engine sump. This at least partially relieves the pressure force exerted on the mechanism 19 by the fluid contained within the chamber 57. The torque imposed on the piston 21 by the timing chain 13 then causes the driven member 22 (and camshaft 17) to rotate in an opposite direction (back toward the original low-load condition) relative to the piston 21, whereby piston 21 thus moves axially rearwardly until the land 79 again covers the groove 71. This thereby closes off the chamber 57 whereby a steady state condition is again achieved. In the above described manner, spool valve 76 will be displaced and positioned in proportion to the magnitude of the vacuum within chamber 97 (which is proportional to engine load), which in turn causes angular displacement of the camshaft 17 in proportion to the engine load.

As will be apparent from the above described operation, the advance and retarding mechanism of the present invention permits variation in the angular phase relationship between the camshaft and the crankshaft of an internal combustion engine in a simple and easy manner in order to vary valve timing events. Specifically, the device can be utilized to vary the angular phase relationship of either or both of the camshafts utilized for controlling the opening and closing movements of the intake and exhaust valves. Further, the use of helical ball splines between the piston member and the driven member permits small angular displacements to be precisely and accurately imposed on the camshaft, thereby permitting desirable control over the noxious exhaust gas emissions.

While in the embodiment shown, the grooves 52 and 53 are shaped to provide an essentially straight-line relationship between the relative amounts of axial and rotative movement of the parts, it will be apparent that a range of desired rotative movements may be obtained from a given axial movement by suitable modification of the helix angle of either or both of said grooves, including progressively changing said helix angle from one end to the other end of said grooves.

The embodiments of the invention in which we claim an exclusive property or privilege are defined as follows:

1. In an engine having a crankshaft and a camshaft laterally spaced from and substantially parallel to the crankshaft, a drive gear connected to the crankshaft adjacent one end thereof, and a timing gear connected to the camshaft adjacent one end thereof and drivingly interconnected to and driven by said drive gear, comprising the improvement wherein a compact phase-adjusting device is disposed between one of said gears and its respective shaft for accurately advancing or retarding the angular relationship of the camshaft relative to the crankshaft, said phase-adjusting device having an axial length substantially less than its radial width and including first and second relatively rotatable members disposed coaxial with said respective shaft, said first member being nonrotatably connected to said respective shaft and said second member being nonrotatably connected to said one gear, said first and second relatively rotatable members having walls disposed adjacent but axially spaced from one another to define a substantially closed fluid pressure chamber therebetween, coupling means including a helical ball-spline device disposed within said closed fluid chamber and coacting between said first and second rotatable members for permitting relative axial and rotational movement therebetween whereby the angular relationship between said camshaft and said crankshaft can be accurately adjusted, mounting means coacting between one of said first and second members and one of said one gear and said respective shaft for permitting said one member to slide axially relative to said respective shaft in response to pressurized fluid being supplied to said chamber, and control means responsive to the load imposed on the engine for permitting pressurized fluid to be supplied to said chamber for causing relative axial rotational movement betwen said first and second members, said control means including shiftable valve means for controlling flow of fluid to said chamber and motor means responsive to the load imposed on said engine for shifting said valve means in proportion to the load imposed on the engine.

2. The combination according to claim 1, wherein said first and second rotatable members each have an annular axially extending flange secured thereto with the flanges on said first and second rotatable members extending axially toward one another in concentric and surrounding relationship, and said helical ball supplying device being disposed between and coacting with said flanges.

3. The combination of claim 1, wherein said valve means includes a shiftable valve spool coaxially disposed relative to said respective shaft, and said fluid chamber having an annular ringlike configuration and being disposed radially outwardly from and in substantial surrounding relationship to said valve spool.

4. The combination according to claim 1, wherein said one gear is nonrotatably connected to said second member by axially elongated straight spline means for permitting relative axial movement therebetween.

5. The combination according to claim 1, wherein said valve means includes a shiftable valve spool coaxially aligned with said first and second rotatable members, and said control means including linkage means coacting between said motor means and said valve spool for causing shifting of said valve spool to respond to the load imposed on said engine, said motor means being fluid pressure actuated and including a reciprocable piston means.

6. A mechanism for advancing or retarding an engine camshaft with respect to an engine crankshaft, said mechanism comprising:
   driving means operatively connected for rotation with said crankshaft and driven means operatively and drivingly connected with said camshaft, said driving means and said driven means forming a fluid pressure chamber therebetween;
   coupling means including a helical ball-spline device disposed within said fluid chamber and coacting between portions of said driving means and said driven means for simultaneously permitting relative axial and rotational movement between at least said portions of said driving means and said driven means, the magnitude of rotational movement being determined by the magnitude of axial movement; and
   control means responsive to the load imposed on the engine for controlling the flow of pressurized fluid to said chamber for causing relative axial and rotational movement between said portions of said driving means and said driven means;
   said control means including shiftable valve means for controlling the flow of fluid to and from said chamber, fluid-actuated motor means for shifting said valve means in proportion to the load imposed on the engine, and linkage means coacting between said motor means and said valve means.

7. A mechanism according to claim 6, wherein said driving and driven means respectively include rotatable driving and driven members coaxially aligned with one of said shafts, said driving and driven members defining said fluid pressure chamber therebetween, and said helical ball spline device and said valve means also being coaxially aligned with said one shaft.

8. A mechanism according to claim 7, wherein a timing gear is nonrotatably interconnected to one of said driving and driven members by substantially straight spline means for permitting relative axial movement therebetween.

9. A mechanism according to claim 6, wherein said driven means includes a driven member coaxially aligned with said camshaft and nonrotatably and axially fixedly secured thereto, said driving means including a driving member coaxially aligned with said camshaft and mounted for rotation and axial sliding movement relative thereto, said driving member being disposed adjacent and axially spaced from said driven member for defining said fluid pressure chamber therebetween, said driving means further including a timing gear rotatably supported on said driven member and means coacting between said driven member and said timing gear for preventing relative axial movement therebetween, means coacting between said timing gear and said driving member for nonrotatably connecting same while permitting relative axial movement therebetween, and said helical ball spline device being operatively connected between said driving and driven members.

10. A mechanism according to claim 6, wherein said driving and driven means respectively include rotatable driving and driven members coaxially aligned with one another and coaxially aligned with one of said shafts, said driving and driven members being axially spaced from one another for defining said fluid pressure chamber therebetween, and means relatively mounting said driving and driven member for relative rotation and axial movement therebetween, means including passageway means communicating with said fluid pressure chamber for supplying pressurized engine lubricant to said chamber for permitting the axial spacing between said driving and driven members to be selectively varied, and said shiftable valve means being associated with said passageway means for controlling the flow of pressurized lubricants therethrough.

* * * * *